(12) United States Patent
Maeda

(10) Patent No.: US 6,195,400 B1
(45) Date of Patent: Feb. 27, 2001

(54) TWO-MODE DEMODULATING APPARATUS

(75) Inventor: Mitsunori Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/048,884

(22) Filed: Mar. 26, 1998

(30) Foreign Application Priority Data

Oct. 20, 1997 (JP) .................................................. 9-287488

(51) Int. Cl.⁷ .................................................. H04B 7/00
(52) U.S. Cl. .................. 375/327; 375/345; 375/349; 329/307; 455/136
(58) Field of Search .................. 375/260, 267, 375/316, 324, 327, 345, 347, 349; 329/307, 308; 455/136, 138, 139, 133

(56) References Cited

U.S. PATENT DOCUMENTS

| 5,203,023 | * | 4/1993 | Saito et al. ......................... 455/133 |
| 5,550,869 | * | 8/1996 | Gurantz et al. ..................... 375/340 |
| 5,822,704 | * | 10/1998 | Ishii .................................... 455/553 |
| 5,835,530 | * | 10/1998 | Hawkes .............................. 375/225 |

FOREIGN PATENT DOCUMENTS

5268138 * 10/1993 (JP) .

* cited by examiner

*Primary Examiner*—Young T. Tse
(74) *Attorney, Agent, or Firm*—Helfgott & Karas, PC.

(57) ABSTRACT

A two-mode demodulating apparatus for use in a radio terminal in a mobile communication system has a linear reception demodulating circuit and a non-linear reception demodulating circuit which can be selectively operated by selecting a mode. The non-linear reception demodulating circuit has a second frequency converting unit for frequency-converting a received signal into a low-frequency signal, a variable-band filtering unit for allowing a signal in a desired band contained in an output of the second frequency converting unit to pass therethrough, and a non-linear reception demodulating process unit for performing a non-linear reception demodulating process on an output from the filtering unit, thereby receiving and demodulating a linear modulated wave and a non-linear modulated wave while suppressing increases of the circuit scale and the power consumption, and generalizing a hardware structure for an applied non-linear modulating system.

9 Claims, 13 Drawing Sheets

TWO-MODE DEMODULATING APPARATUS

BACKGROUND OF THE INVENTION (1) Field of the Invention

The present invention relates to a two-mode demodulating apparatus suitable for use in a radio terminal in, for example, a mobile communication system.

(2) Description of Related Art

Shortage of frequency bands usable as transmission frequencies with an increase of subscribers is showing up in recent radio communication system, which causes troubles in communication such that a telephone line is often interrupted or a telephone communication becomes broken, etc. In order to avoid such troubles in the communication, there have been developed and operated various techniques of improving efficiency of frequency utilization as countermeasures.

A digital communication system having a higher efficiency of frequency utilization using a linear modulation system comes to be used, for instance. However, the number of base stations to which such digital communication system having a higher efficiency of frequency utilization is still insufficient and an area in which the digital communication can be used is limited, as compared with analog communication systems using known linear modulating systems.

There is a demand for a communication terminal which can use both of the above two communication system to make a communication in a digital communication system in an area in which the digital communication system is usable, while making a communication in an analog system in an area in which the digital communication system is not usable but only an analog communication system is usable.

FIG. 12 is a block diagram showing a two-mode demodulating apparatus used as a receiving unit of a communication terminal being able to use two communication systems as above. Namely, a two-mode receiving apparatus 100 shown in FIG. 12 has a linear wave receiving circuit 110, a non-linear wave receiving circuit 120 and a digital processing unit 130.

In the two-mode receiving apparatus 100 shown in FIG. 12, the digital processing unit 130 can control the linear wave receiving circuit 110 to receive a linear modulated wave signal, and the non-linear wave receiving circuit 120 to receive a non-linear modulated wave signal of intermediate frequency (IF) signals as received signals.

The linear wave receiving circuit 110 has a variable gain amplifier 111, multipliers 112I and 112Q, a 90° phase shifter 114, linear wave receiving band-limit filters 115I and 115Q, high-speed A/D (Analog/Digital) converters 116I and 116Q, a frequency finely tunable temperature-compensated oscillator (VC-TCXO) 117, and a PLL (Phase Locked Loop) unit 118.

The non-linear wave receiving circuit 120 has a multiplier 121, a local oscillator 122, a non-linear wave receiving filter 123, a limiter-amplifier 124, and a quadrature detector 125, a non-linear receiving filter 126 and an A/D converter 127.

The digital processing unit 130 has a liner wave receiving process unit 131, a local oscillated frequency setting unit 132, a frequency correcting unit 133, a gain controlling unit 134, a received electric field strength computing unit 135, and a non-linear wave receiving process unit 136.

In the two-mode receiving apparatus 100 with the above structure shown in FIG. 12, a linear modulated wave signal as a received signal received by the linear wave receiving circuit 110 is subjected to an automatic gain control in the variable gain amplifier 111, mixed with a local signal fed from the PLL unit 118 to be detected in orthogoanl detection in a quasi-synchronous system, whereby baseband signals in two systems are outputted.

The above PLL unit 118 performs a PLL control on a signal from the temperature-compensated oscillator 117, which has been subjected to a frequency control (quasi-synchronous correction) on the basis of the received signal by the digital processing unit 130, and outputs the signal as a local signal for the orthogonal detection in the multipliers 112I and 112Q.

The baseband signals (analog signals) outputted from the multipliers 112I and 112Q are band-limited in the respective linear wave receiving band-limit filters 115I and 115Q, converted and demodulated into digital signals in the respective high-speed A/D converters 116I and 116Q, and outputted to the digital processing unit 130 in the following stage.

A non-linear modulated wave signal as the receive signal received by the non-linear wave receiving circuit 120 is mixed with a local signal from the local oscillator 122 provided separately from the function unit (refer to reference numerals 117 and 118) local oscillator 118 outputting the above local signal for receiving a linear modulated wave in the multiplier 121, and converted into an intermediate frequency signal.

The intermediate frequency signal from the multiplier 121 is limited to a band set in advance by the non-linear wave receiving band-limit filter 123. In other words, the intermediate frequency signal having passed through the non-linear wave receiving band-limit filter 123 is limited to a signal whose band is fixedly set in advance.

The baseband signal having passed through the non-linear receiving band-limit filter 123 is limited and amplified by the limiter-amplifier 124, then subjected to a quadrature detection in the quadrature detector 125 configured with a multiplier 125a and a phase shifter 125b. In the non-linear wave receiving band-limit filter 126 and the A/D converter 127, only a desired modulated signal is selectively taken out from the baseband signal, converted into a digital signal, and outputted to the digital processing unit 130 in the following stage.

However, in the above two-mode receiving apparatus 100 shown in FIG. 12, the non-linear wave receiving band-limit filter 123 in, for example, the non-linear wave receiving circuit 120 is of a large size since it is a passive component applied a resonance phenomenon, resulting in a large scale circuit. If the above two-mode receiving apparatus is applied to a mobile terminal in a mobile communication system, for example, it is difficult to meet a strong demand for portability or compactness of the terminal.

The above non-linear wave receiving band-limit filters 123 and 126 are used to fixedly set respective pass-bands in advance. On the other hand, the non-linear modulated wave passes through a different band according to a type of system (analog communication system) such as AMPS, TACS, NAMPS, NTACS or the like so that it is difficult to versatilely use hardware to an applied non-linear modulated wave system.

In other words, in the above non-linear wave receiving band-limit filters 123 and 126, it is difficult to dynamically change a pass band. Accordingly, it is necessary to change or switch the filter to be used according to a required non-linear modulation system, besides it is difficult to reduce the cost or improve the reliability when the apparatus including the non-linear receiving filters is formed into an LSI (Large-Scale Integrated circuit).

Meanwhile, a two-mode receiving apparatus 100A shown in FIG. 13 has, although having structural elements basically similar to those of the above linear receiving circuit 110 shown in FIG. 12, non-linear wave receiving band-limit filters 126I and 126Q, and A/D converters 127I and 127Q on the output's side of the multipliers 112I and 112Q as a receiving system for a non-linear modulated wave, besides using the structural elements of the linear wave receiving circuit 110 (refer to reference numerals 111, 112I, 112Q, 114, 117 and 118), thereby reducing a scale of the circuit.

In the two-mode receiving apparatus 100A shown in FIG. 13, a digital processing unit 130A has a linear wave receiving process unit 131, a local oscillated frequency setting unit 132, a frequency correcting unit 133, a gain controlling unit 134 and a non-linear wave receiving process unit 136, basically similar to those of the above two-mode receiving apparatus 100 shown in FIG. 12.

The two-mode receiving apparatus 100A shown in FIG. 13 receives and demodulates a linear modulated wave in the same way as the above two-mode receiving apparatus 100 shown in FIG. 12 when receiving the linear modulated wave. When receiving a non-linear modulated wave, the two-mode receiving apparatus 100A shown in FIG. 13 performs an automatic gain control, then converts the non-linear modulated wave into baseband signals in two systems, as well as the above linear modulated wave.

However, in the above two-mode demodulating apparatus 100A shown in FIG. 13, the non-linear wave receiving band-limit filters 126I and 126Q are not variable. In addition, it is impossible to completely eliminate steady-state frequency deviation in the quasi-synchronous detection system so that it is difficult to perform a demodulating process corresponding to each of various non-linear modulated waves (particularly, NAMPS, NTACS, etc.).

Namely, although the above two-mode receiving apparatus 100A shown in FIG. 13 converts not only a linear wave modulated signal but also a non-linear wave modulated signal into baseband signals in two systems in the quasi-synchronous detection system, it is difficult to demodulate the signal with a high accuracy since frequency deviation in the non-linear modulated wave in a system such as NTACS, NAMPS or the like is particularly small.

In this case, an AFC (automatic frequency control) operation, which is not required originally in the non-linear receiving circuit, is required in order to eliminate the above steady-state frequency deviation, besides the A/D converters 116I, 116Q, 126I and 126Q are required to be provided separately for the linear modulated wave and the non-linear modulated wave, which causes an increase in power consumption.

SUMMARY OF THE INVENTION

In the light of the above problems, an object of the present invention is to provide a two-mode modulating apparatus which can receive and demodulate a linear-modulated wave and a non-linear modulated wave while restricting an increase of the circuit scale and the power consumption, and generalizing a hardware structure for an applied non-linear modulating system.

The present invention therefore provides a two-mode demodulating apparatus having a linear reception demodulating circuit and a non-linear reception demodulating circuit, in which the linear reception demodulating circuit and the non-linear reception demodulating circuit can be selectively operated by selecting a mode, the two-mode demodulating apparatus comprising the linear reception demodulating circuit comprising first frequency converting units for frequency-converting a received signal into a low-frequency signal using a first local signal having a first oscillated frequency from a variable oscillated-frequency local oscillator, linear reception demodulating process units for performing linear reception demodulating processes on outputs of the first frequency-converting units, the non-linear reception demodulating circuit comprising a second frequency converting unit for frequency-converting the received signal into a low-frequency signal using a second local signal from the local oscillator having a second oscillated frequency different from the first oscillated frequency of the first local signal, a variable-band filtering unit for allowing a signal in a desired band contained in an output of the second frequency converting unit to pass therethrough, and a non-linear reception demodulating process unit for performing a non-linear reception demodulating process on an output of the filtering unit.

When the non-linear reception demodulating circuit is selected, the second frequency converting unit frequency-converts an intermediate frequency signal as the received signal into a signal in the vicinity of the baseband by changing an oscillated frequency of the local oscillator.

The filtering unit may be configured as an active variable-band filtering unit. In which case, a switched capacitor filter may be used as the variable-band filtering unit.

The non-linear reception demodulating process unit may have a delay detecting circuit for performing a delay detecting process on an output from the filtering unit, and a low-pass filter/analog-to-digital converting process unit for performing a low-pass filtering process and an analog-to-digital converting process on an output from the delay detecting circuit.

The non-linear reception demodulating unit may alternatively have a frequency measuring circuit for performing a frequency measuring process on an output from the filtering unit to output a digital demodulated signal.

The non-linear reception demodulating process unit may still alternatively have an analog-to-digital converting circuit for receiving an output from the filtering unit to perform a down sampling operation. In which case, the analog-to-digital converting circuit may have sample-and-hold circuits in two systems for extracting two samples at predetermined time intervals to detect a direction of phase rotation.

The two-mode demodulating apparatus may further have a gain controlling amplifier for controlling a gain of the received signal before the received signal is inputted to the linear reception demdoualting circuit and the non-linear reception demodulating circuit, wherein the non-linear reception demodulating process unit has an envelope detecting circuit for performing an envelope detecting process on an output from the filtering unit and a comparing circuit for comparing an output from the envelope detecting circuit with a predetermined reference value to output a signal for controlling the gain controlling amplifier.

According to this invention, there are provided the second frequency converting unit, the variable-band filtering unit and the non-linear receiving demodulating process unit to the two-mode demodulating apparatus. It is thereby possible to cope with various non-linear modulation systems along with a linear modulation system, while generalizing a hardware structure for an applied non-linear modulation system, and accomplishing a common use of the circuit with decreased-scale hardware.

According to this invention, by providing the frequency measuring circuit to the two-mode demodulating apparatus, it is possible to directly demodulate and convert the received signal as an input signal into a digital signal so that an A/D converting process by an A/D converter is unnecessary when the two-mode demodulating apparatus receives a nonlinear modulated wave. Consequently, not only the circuit scale can be decreased but also the power consumption can be remarkably decreased.

According to this invention, by providing the analog-to-digital converting circuit for performing a down sampling operation to the two-mode demodulating apparatus, the received signal as an input signal can be directly demodulated and converted into a digital signal. Therefore, a complicated digital processing is unnecessary, thus the control can be simplified. In addition, it is possible to largely decrease a scale of a peripheral circuit, whereby the package is decreased and the power consumption is also largely decreased.

According to this invention, by providing the envelope detecting circuit and the comparing circuit along with the gain controlling amplifier to the two-mode demodulating apparatus, it is possible to measure a received electric field strength with an accuracy as high as a linear receiving system by a simple system so as to control the received electric field strength of a received signal even when a non-linear modulated wave is received.

DESCRIPTION OF THE PREFERRED EMBODIMENTS

Figure 1:
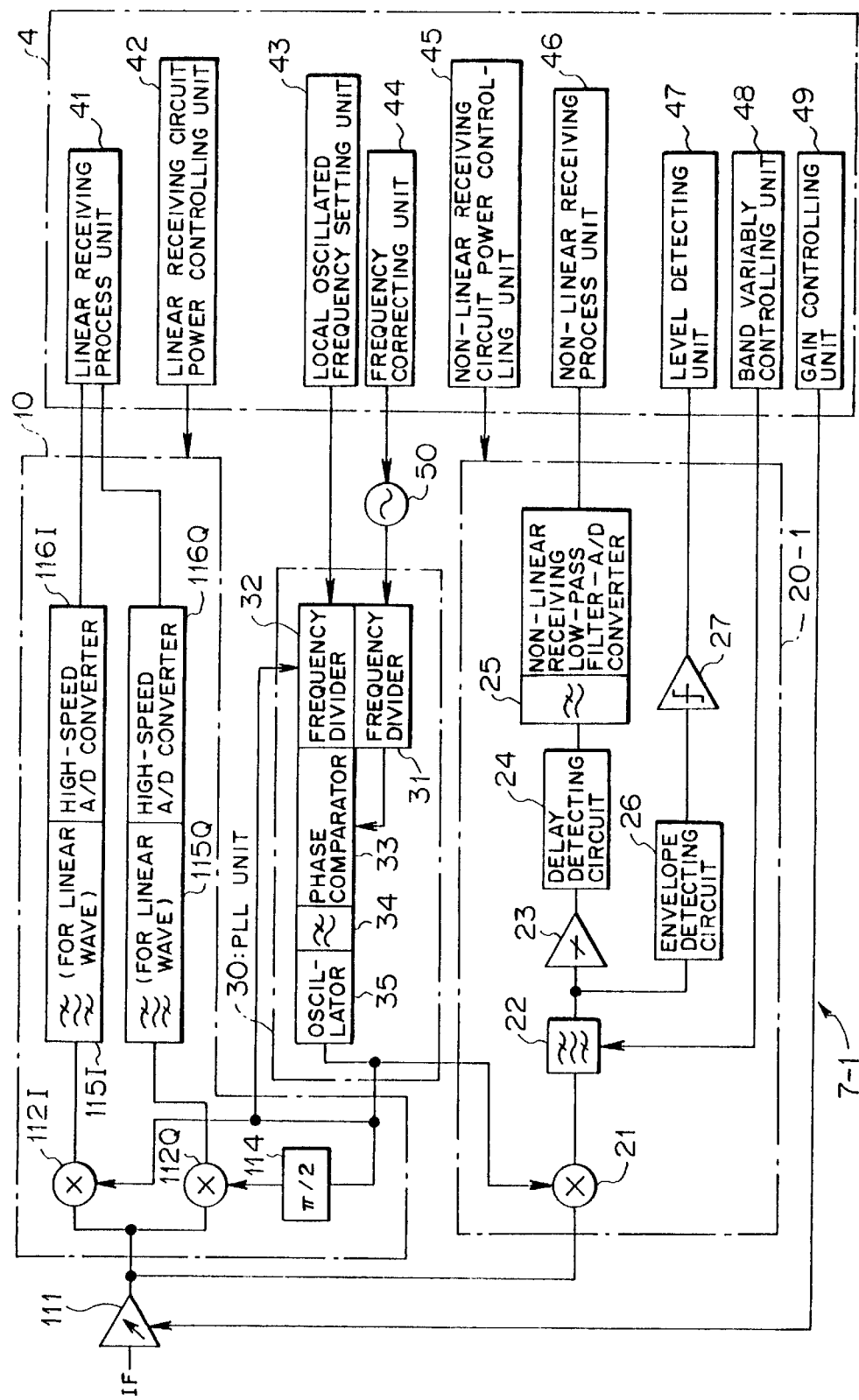
FIG. 1 is a block diagram showing a two-mode demodulating apparatus according to a first embodiment of this invention.

Hereinafter, description will be made of embodiments of the present invention referring to the drawings.

(a) Description of a First Embodiment

FIG. 1 is a block diagram showing a two-mode demodulating apparatus according to a first embodiment of this invention. A two-mode demodulating apparatus 7-1 shown in FIG. 1 is applicable to a linear/non-linear receiving process unit 3 and a digital processing unit 4 as a received signal processing system of a mobile station 1 in a mobile communication system as shown in FIG. 2, for example.

Figure 2:
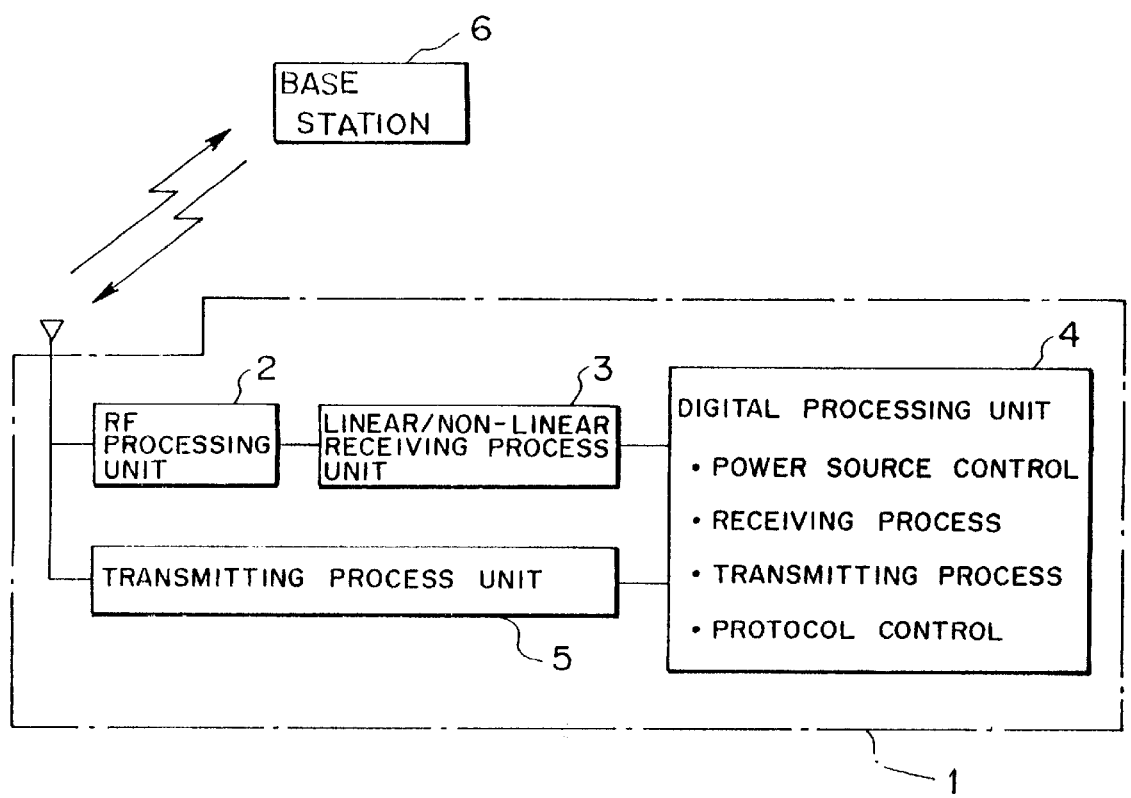
FIG. 2 is a functional block diagram showing a mobile station in a mobile communication system to which the two-mode demodulating apparatus according to the first embodiment is applied.

The mobile station 1 shown in FIG. 2 has an RF processing unit 2 and the linear/non-linear receiving process unit 3 as a receiving system, the digital processing unit 4, and a transmitting process unit 5, thereby exchanging a linear modulated wave in a digital communication system or a non-linear modulated wave in an analog communication system with a base station 6.

The RF processing unit 2 performs frequency conversion on a received signal (RF signal) in a high frequency, and outputs an intermediate frequency signal (IF signal) as the received signal. The linear/non-linear reception processing unit 3 demodulates a linear modulated wave signal or a non-linear modulated wave signal as the intermediate frequency signal from the RF processing unit 2, and outputs a digital signal to the digital processing unit 4.

The digital processing unit 4 performs a power source control on the mobile station 1, a receiving process such as regeneration or the like on the received signal demodulated in the linear/non-linear receiving process unit 3, and a transmitting process on a signal to a base station 6 and a protocol control. With respect to the linear/non-linear receiving process unit 3, the digital processing unit 4 has a linear receiving process unit 41, a linear receiving circuit power controlling unit 42, a local oscillated frequency setting unit 43, a frequency correcting unit 44, a non-linear receiving circuit power controlling unit 45, a non-linear receiving process unit 46, a level detecting unit 47, a band variably controlling unit 48, and a gain controlling unit 49.

The transmitting process unit 5 is inputted transmit data from the digital processing unit 4 to perform a modulating process in a desired system, and transmits the data to the base station 6.

The linear/non-linear receiving process unit 3 has, with respect to a function of the digital processing unit 4 in the following stage, a variable gain amplifier 111, a linear reception demodulating circuit 10, a non-linear reception demodulating circuit 20-1, a PLL unit 30 and a frequency finely tunable temperature-compensated oscillator (VC-TCXO) 50, as shown in detail in FIG. 1 mentioned above.

The variable gain amplifier 111 performs a gain control on the received signal having been converted into the intermediate frequency signal in the RF processing unit 2 before the received signal is inputted to the linear reception demodulating circuit 10 and the non-linear reception demodulating circuit 20-1, which functions as a gain-controller amplifier.

As to states of operations of the above linear reception demodulating circuit 10 and the non-linear reception demodulating circuit 20-1, the linear reception demodulating circuit 10 and the non-linear reception demodulating circuit 20-1 may be selectively operated by setting and controlling a clock frequency as a local signal used when the received signal is converted into the baseband signals according to a linear modulated wave or a non-linear modulated wave to be received.

Figure 12:
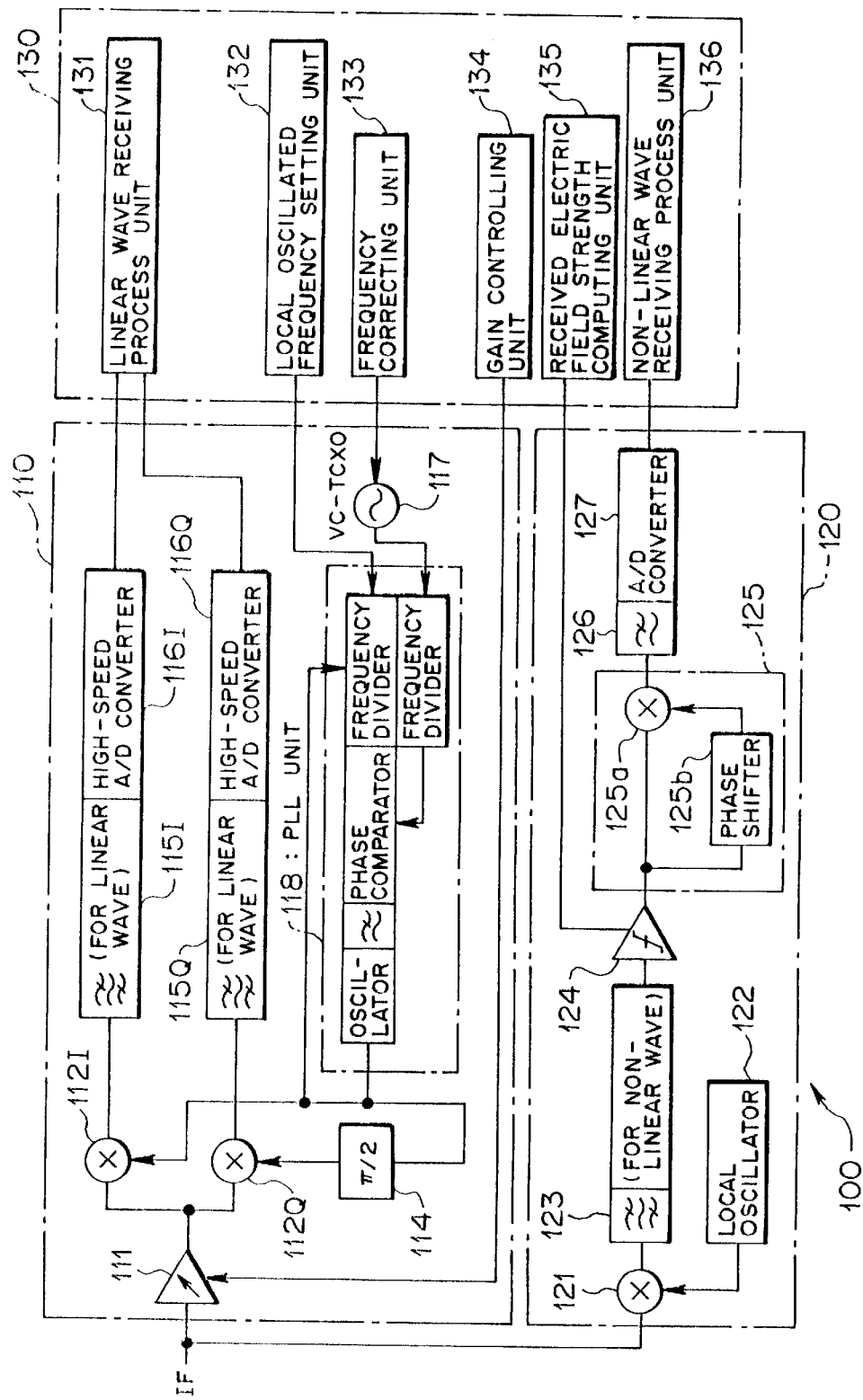
FIGS. 12 and 13 are block diagrams showing known two-mode demodulating apparatus.
Figure 13:
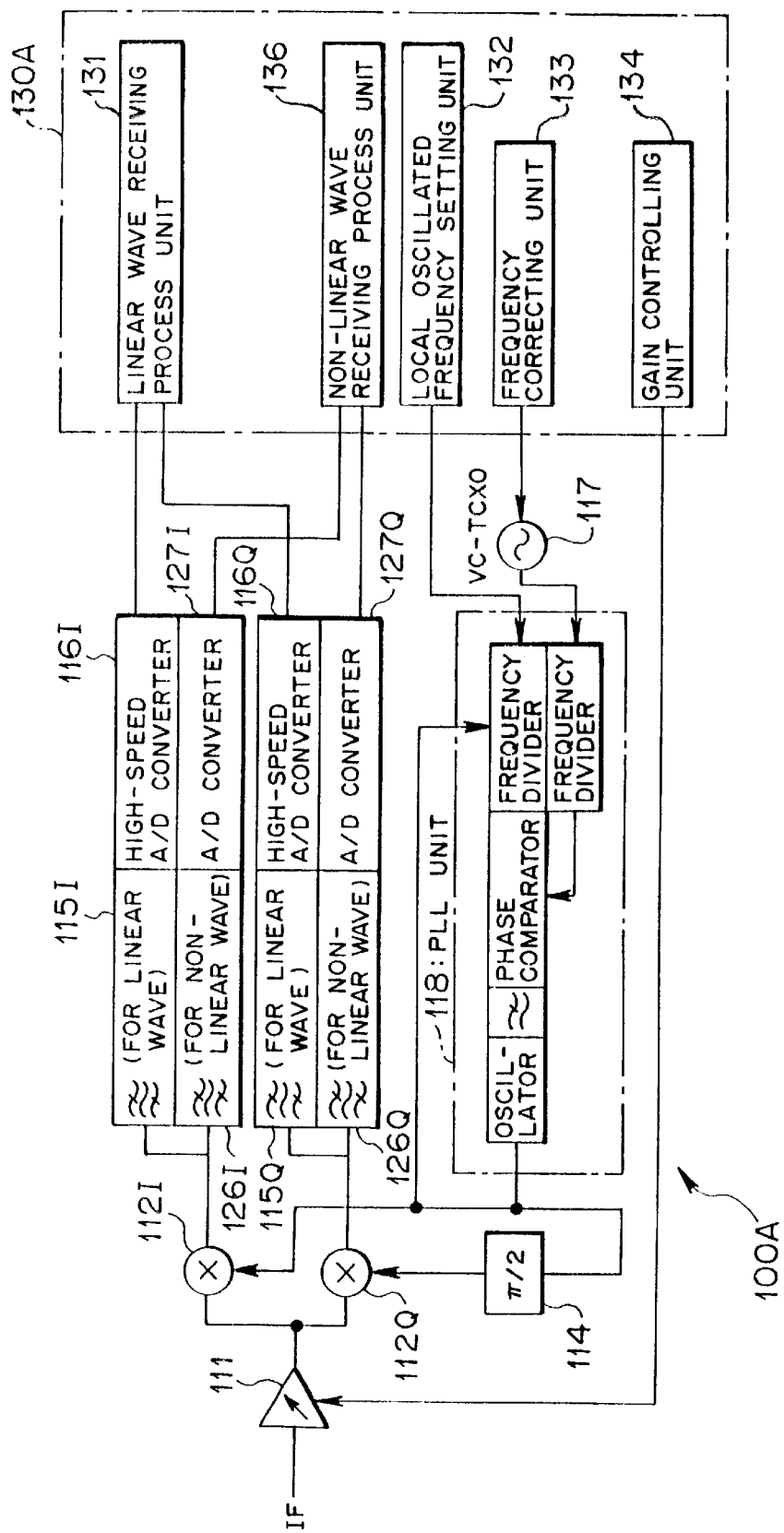

The linear reception demodulating circuit 10 shown in FIG. 1 has, in detail, multipliers 112I and 112Q, a 90° phase shifter 114, linear wave receiving band-limit filters 115I and 115Q, high-speed A/D converters 116I and 116Q similar to those shown in FIG. 12 or 13 described hereinbefore.

After the variable gain amplifier 111 amplifies the received signal under an automatic gain control, the linear reception demodulating circuit 10 mixes this linear modulated signal with a local signal generated by the temperature-compensated oscillator 50 and the PLL unit 30 in cooperation in the multipliers 121I and 121Q, performs orthogonal detection on the mixed signal in the quasi-synchronous system, thereby outputting baseband signals in two systems.

The baseband signals (analog signals) outputted from the multipliers 112I and 112Q are band-limited in the linear wave receiving band-limit filters 115I and 115Q, respectively, converted and demodulated into digital signals in the respective high-speed A/D converters 116I and 116Q, and outputted to the linear wave receiving process unit 41 in the digital processing unit 4 in the following stage.

Therefore, the multipliers 112I and 112Q and the 90° phase shifter 114 mentioned above function as a first frequency converting unit for frequency-converting the received signal into a low frequency signal using a first local signal having a first oscillated frequency from the PLL unit 30 having a function as a variable oscillated frequency local oscillator, whereas the linear wave receiving band-limit filters 115I and 115Q and the high-speed A/D converters 116I and 116Q function as a linear reception demodulating process unit for performing a linear reception demodulating process on outputs of the multipliers 112I and 112Q.

The above PLL unit 30 has functions as frequency dividers 31 and 32, a phase comparator 33, a loop filter 34 and an oscillator 35 to generate a signal obtained by performing a PLL control on a clock signal (having been subjected to a necessary frequency correction on the basis of the received signal in the frequency correcting unit 44) from the temperature-compensated oscillator 50 on the basis of frequency information of the local oscillator set by the local oscillated frequency setting unit 43.

The frequency divider 31 demultiplies a frequency of the clock signal from the temperature-compensated oscillator 50, whereas the frequency divider 32 is fed back and inputted a signal as the local signal used when the above linear modulated wave or the non-linear modulated wave is converted into the baseband signals to perform a dividing process corresponding to the above frequency divider 32.

The phase comparator 33 compares phases of the signals from the frequency dividers 31 and 32. The oscillator 35 is inputted a result of the phase comparison from the phase comparator 33 via the loop filter 34, and outputs a clock signal whose phase is controlled to be constant on the basis of the result of the phase comparison as the local signal.

The PLL unit 30 generates a local signal for orthogonal detection to be performed on a linear modulated wave signal in the linear reception demodulating circuit 10 when a linear modulated wave is received, while generating a local signal for converting a non-linear modulated wave signal into a signal, described later, containing not only a baseband but also a band in the vicinity of the baseband when a non-linear modulated wave is received.

Namely, the signal from the PLL unit 30 is also used as the local signal when the non-linear modulated wave signal is converted into baseband signals, thereby accomplishing a common clock generating source upon signal detection in the linear receiving circuit 10 and the non-linear receiving circuit 20-1.

The non-linear receiving circuit 20-1 has, in detail, a multiplier 21, a band-pass filter 22, a limiter amplifier 23, a delay detecting circuit 24, a non-linear receiving low-pass filter-A/D converter 25, an envelope detecting circuit 26 and a comparator 27. The non-linear receiving circuit 20-1 can demodulate a received signal in an arbitrary nonlinear modulating system independent of various systems (AMPS, TACS, NAMPS, NTACS, etc.), and output the demodulated received signal as a digital signal to the digital processing unit 4.

The multiplier 21 converts the received signal amplified by the variable gain amplifier 111 (under the automatic gain control by the gain controlling unit 49) into a signal (having a low-frequency offset) containing all bands used upon demodulation in the above various systems (AMPS, TACS, NAMPS, NTACS, etc.) on the basis of the local signal from the above PLL unit 30.

In the PLL unit 30, when the non-linear reception demodulating circuit 20-1 is selected as a receive mode, an oscillated frequency of the local signal genenerated by the PLL unit 30 is changed to an oscillated frequency different from one used upon linear reception, by switching a setting in the PLL unit 30 by the local oscillated frequency setting unit 43.

Whereby, the multiplier 21 mixes the non-linear modulated wave signal from the variable gain amplifier 111 with the local signal from the PLL unit 30 whose oscillated frequency is set by the local oscillated frequency setting unit 43 to convert the received signal into a signal containing a band in the vicinity of the baseband.

Therefore, the above multiplier 21 functions as a second frequency converting unit for frequency-converting the received signal into a low frequency signal using a second local signal from the PLL unit 30 having a second oscillated frequency different from the first oscillated frequency possessed by a first local signal for receiving the linear modulated wave.

The function of the above multiplier 21 may be provided to either the multiplier 112I or the multiplier 112Q of the above-mentioned linear receiving circuit 10 so as to be used in common.

The band-pass filter 22 allows only a signal in a band (baseband signal) corresponding to a system used when the received signal is received among the above various systems in the signal containing a band in the vicinity of the baseband converted by the above multiplier 21 to pass therethrough.

In other words, the band-limit filter 22 functions as a variable band filtering unit for allowing a signal in a desired band contained in an output of the multiplier 21 so as to provide a band limit adapting a non-linear modulating system selected as a system to be received on the received signal from the multiplier 21.

The above band-limit filter 22 may be configured as an active variable band filtering unit. As this active variable band filtering unit, there may be used a switched capacitor filter (SCF).

Namely, the band variably controlling unit 48 in the digital processing unit 4 can variably control a pass-band of the SCF, thereby actively set a pass-band according to a system to be adapted among various systems of non-linear modulated waves as above.

Figure 3:
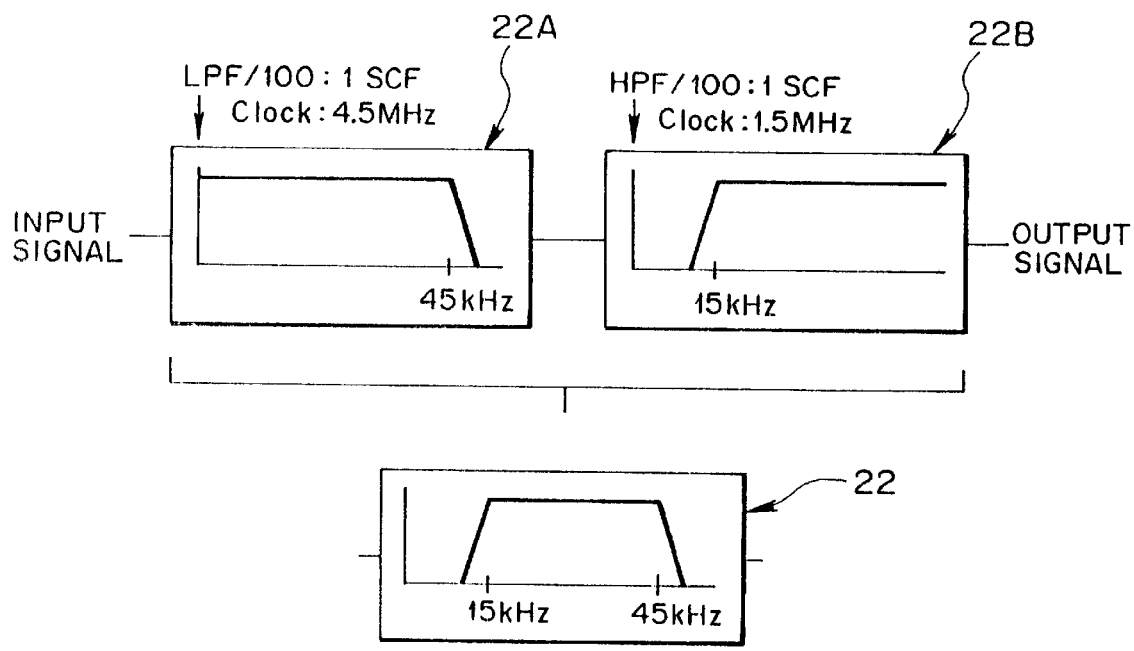
FIGS. 3 and 4 are diagrams for illustrating filter characteristics of a band-limit filter according to the first embodiment.

If the baseband bandwidth is of a pass-band width 30 kHZ whose center frequency is 30 kHz, the band-limit filter 22 can be configured by connecting in series a pair of switched capacitor filters 22A and 22B having characteristics as shown in FIG. 3, for example.

In which case, the SCF 22A functions as a low-pass filter (LPF) having a characteristic to allow only lower frequency components than a frequency of about 45 kHz to pass therethrough, whereas the SCF 22B functions as a high-pass filter (HPF) having a characteristic to allow only higher frequency components than a frequency of about 15 kHZ to pass therethrough.

Figure 4:
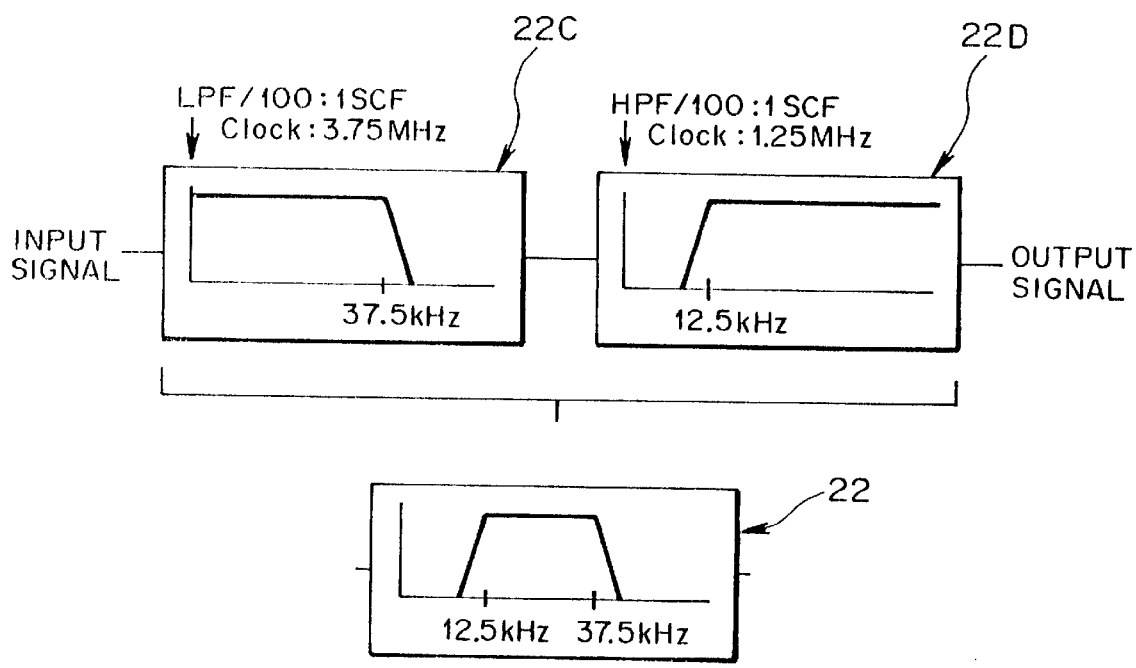

If the baseband bandwidth is of a pass-band width 25 kHz whose center frequency is 30 kHz, the band-limit filter 22 can be configured by connecting in series a pair of switched capacitor filters (SCF; Switched Capacitor Filter) 22C and 22D having characteristic as shown in FIG. 4, for example.

In which case, the SCF 22C functions as a low-pass filter (LPF) having a characteristic to allow lower frequency components than a frequency of about 37.5 kHz to pass therethrough, whereas the SCF 22D functions as a high-pass filter (HPF) having a characteristic to allow higher frequency components than a frequency of about 12.5 kHz to pass therethrough.

The limiter amplifier 23 limits and amplifies the received signal whose band has been limited by the above band-limit filter 22. The delay detecting circuit 24 performs a delay detecting process on the received signal having been limited and amplified by the limiter amplifier 23 to demodulate the received signal.

The non-linear receiving low-pass filter-A/D converter 25 performs a low-pass filtering process and an analog-to-digital converting process on the demodulated signal (analog signal) outputted from the delay detecting circuit 24, thereby converting the demodulated signal into a digital signal while eliminating noise components in the demodulated signal.

The limiter amplifier 23, the delay detecting circuit 24 and the non-linear receiving low-pass filter-A/D converter 25 cooperate to function as a non-linear reception demodulating process unit for performing a non-linear reception demodulating process on an output from the band-limit filter 22.

The envelope detecting circuit 26 performs an envelope detection on a signal whose band has been limited by the band-limit filter 22, and outputs level information (direct current components, analog information) of carrier wave components contained in the received signal. The comparator 27 compares the level information of the direct current components from the envelope detecting circuit 26 with a reference level set in advance, and outputs a result of the comparison to the level detecting unit 47 in the digital processing unit 4.

The level detecting unit 47 variably controls an amplification factor of the variable gain amplifier 111 in the gain controlling unit 49 on the basis of the result of the comparison relating to the direct current components contained in the received signal inputted from the comparator 27, thereby controlling such that the signal is received with appropriate direct current components. Namely, even when the apparatus receives a non-linear modulated wave, it is possible to obtain a desired electric field strength by configuring a feed-back loop similar to that employed when a linear modulated wave is received.

In concrete, if the direct current components contained in the received signal are above a predetermined level, the level detecting unit 47 notifies the gain controlling unit 49 of it, whereby the gain controlling unit 49 controls the variable gain amplifier 111 to decrease a gain of the received signal to be amplified therein and outputted therefrom. If the direct current components contained in the received signal are below the predetermined level, the level detecting unit 47 notifies the gain controlling unit 49 of it, whereby the gain controlling unit 49 controls the variable gain amplifier 111 to increase a gain of the received signal to be amplified therein and outputted therefrom.

Therefore, the above comparator 27 is configured as a comparing circuit which can compare an output from the envelope detecting circuit 26 with a predetermined reference value and output a signal controlling the variable gain amplifier 111.

The liner receiving circuit power controlling unit 42 in the digital processing unit 4 controls to turn on power supply to the linear reception demodulating circuit 10 when making the linear reception demodulating circuit 10 an operative state, whereas turning off the power supply to the linear reception demodulating circuit 10 when making the linear reception demodulating circuit 10 an inoperative state.

Similarly, the non-linear receiving circuit power controlling unit 45 in the digital processing unit 4 controls to turn on power supply to the non-linear reception demodulating circuit 20-1 when making the non-linear reception demodulating circuit 20-1 the operative state, whereas tuning off the power supply to the non-linear reception demodulating circuit 20-1 when making the non-linear reception demodulating circuit 20-1 the inoperative state.

In the mobile station 1 to which the two-mode demodulating apparatus 7-1 according to the first embodiment is applied, the linear receiving circuit power controlling unit 42 and the non-linear receiving circuit power controlling unit 45 control to make the non-linear reception demodulating circuit 20-1 the inoperative state (power supply OFF) when making the linear reception demodulating circuit 10 the operative state (power supply ON), whereas controlling to make the linear reception demodulating circuit 20-1 the inoperative state (power supply OFF) when making the non-linear reception demodulating circuit 20-1 the operative state (power supply ON), thereby making only one system of the A/D converting function the operative state.

Figure 5:
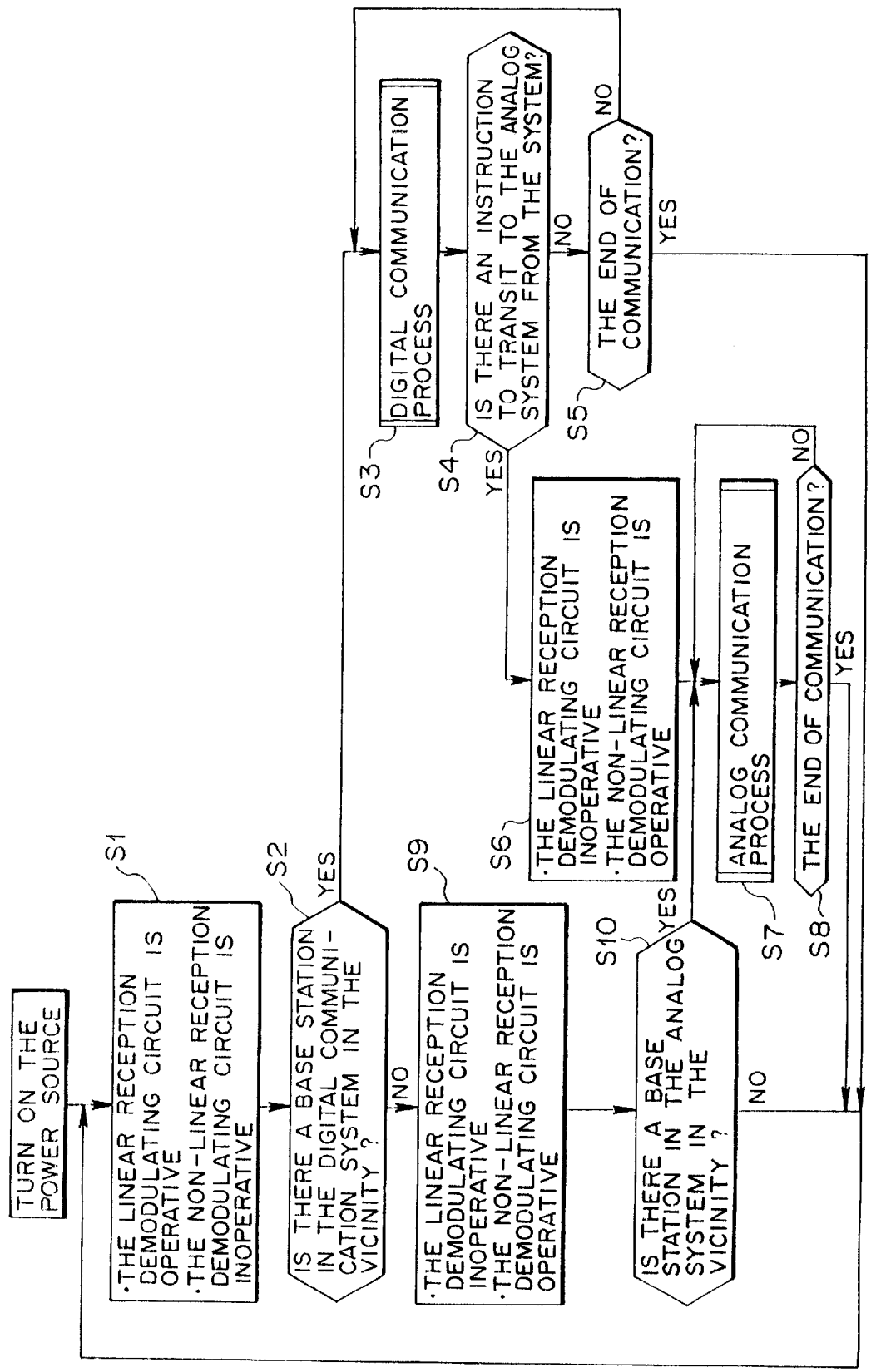
FIG. 5 is a flowchart for illustrating an operation of the mobile station in the mobile communication system to which the two-mode demodulating apparatus according to the first embodiment is applied.

Hereinafter, description will be made of an operation of the mobile station 1 to which the two-mode demodulating apparatus 7 according to the first embodiment of this invention is applied with reference to a flowchart shown in FIG. 5.

When a power of the mobile station 1 is turned on, the local oscillated frequency setting unit 43 in the digital processing unit 4 sets a local frequency of the PLL unit 30, thereby making the linear reception demodulating circuit 10 the operative state, while making the non-linear reception demodulating circuit 20-1 the inoperative state under controls of the linear receiving circuit power controlling unit 42 and the non-linear receiving circuit power controlling unit 45 (Step S1) so as to set a mode of communication in a digital communication system.

The mobile station 1 receives a signal (pilot signal, for example) from a base station in the vicinity to determine whether or not there is a base station in the digital communication system in the vicinity of the mobile station 1 (Step S2). If it is determined that there is a base station in the digital system in the vicinity, the mobile station 1 performs a digital communication process via that base station in the digital system (Step S3).

Namely, the linear reception demodulating circuit 10 becomes the operative state, the multipliers 112I and 112Q perform orthogonal detection in the quasi-synchronous system on a received signal subjected to the automatic gain control to convert the received signal into baseband signals in two systems, the linear wave receiving band-limit filters 115I and 115Q and the high-speed A/D converters 116I and 116Q convert the baseband signals into demodulated signals as digital signals, then the linear wave receiving circuit 41 in the digital processing unit 4 performs a regenerating process and the like.

If there occurs no instruction to transit to an analog communication system (from the base station in this case) during such communication in the digital communication system (NO route at Step S4), the digital communication process as above is continued until the end of the communication (from NO route at Step S5 to Step S3).

If there occurs an instruction to transit to the analog communication system from the system during the communication in the digital communication system, the local oscillated frequency setting unit 43 in the digital processing unit 4 changes the setting of a local frequency in the PLL unit 30, besides the liner receiving circuit power controlling unit 42 and the non-linear receiving circuit power controlling unit 45 control to make the linear reception demodulating circuit 10 the inoperative state while making the non-linear reception demodulating circuit 20-1 the operative state (from YES route at Step S4 to Step S6).

Whereby, this communication is switched to a communication process in the analog communication system (Step S7). Incidentally, the communication process in the analog communication system is continued until the communication is terminated (Step S8).

In this case, the multiplier 21 converts the received signal amplified by the variable gain amplifier 111 on the basis of the local signal from the PLL unit 30 into a second intermediate frequency signal (that is, a signal containing basebands in various systems), the band-limit filter 22 then limits the bandwidth of the signal so as to allow only a signal in a pass-band adapted to a non-linear modulation system applied as a modulation-demodulation system to pass therethrough.

The received signal band-limited and branched is subjected to envelope detection in the envelope detecting circuit 26, then compared with the reference level in the comparator 27, whereby an electric field strength is obtained by configuring a feed-back loop similar to that applied upon linear reception.

In the above mobile station 1, if it is determined that there is no base station in the digital communication system in the vicinity when the power is turned on and the linear reception demodulating circuit 10 is made the operative state, the local oscillated frequency setting unit 43 sets the local frequency of the PLL unit 30, besides the linear reception demodulating circuit 10 is made the inoperative state while the non-linear reception demodulating circuit 20-1 is made the operative state under the controls of the linear receiving circuit power controlling unit 42 and the non-linear receiving circuit power controlling unit 45 so as to change the mode and set it to a mode of communication in the analog communication system (from NO route at Step S2 to Step S9).

Whereby, the mobile station 1 exchanges a signal with a base station in the vicinity to determine whether or not there is a base station in the analog communication system in the vicinity of the mobile station 1 (Step S10).

In this case, if there is a base station in the analog communication system in the vicinity, a communication process in the analog communication system is performed similarly to the above case (from YES route at Step S10 to Step S7). If there is no base station in the analog communication system in the vicinity, the linear reception demodulating circuit 10 in the digital communication system is again made the operative state to search for a base station in the digital communication system (from NO route at Step S10 to Step S1).

The two-mode demodulating apparatus according to the first embodiment of this invention has the multiplier 21 as the second frequency converting unit, the band-limit filter 22 as the variable-band filtering unit, and the delay detecting circuit 24 and the non-linear receiving low-pass filter-A/D converter 25 as the non-linear reception demodulation processing unit, as above. Accordingly, it is possible to provide relatively small scale hardware which can cope with various non-linear modulation systems along with a linear modulation system, while commonly using the circuit and generalizing the hardware structure for an applied non-linear modulation system.

According to this invention, the A/D converter to be in the operative state may be either one system of the A/D converter in the linear reception demodulating circuit 10 or the non-linear reception demodulating circuit 20-1, so that the power consumption is decreased.

According to this invention, there are provided the envelope detecting circuit 26 and the comparator 27 along with the variable gain amplifier 111. Consequently, it is possible to measure a received electric field strength with a high accuracy in the same degree as the linear reception system even with a simple system, thus enabling a control on the received electric field strength of the received signal even when a non-linear modulated wave is received.

(b) Description of a Second Embodiment

Figure 6:
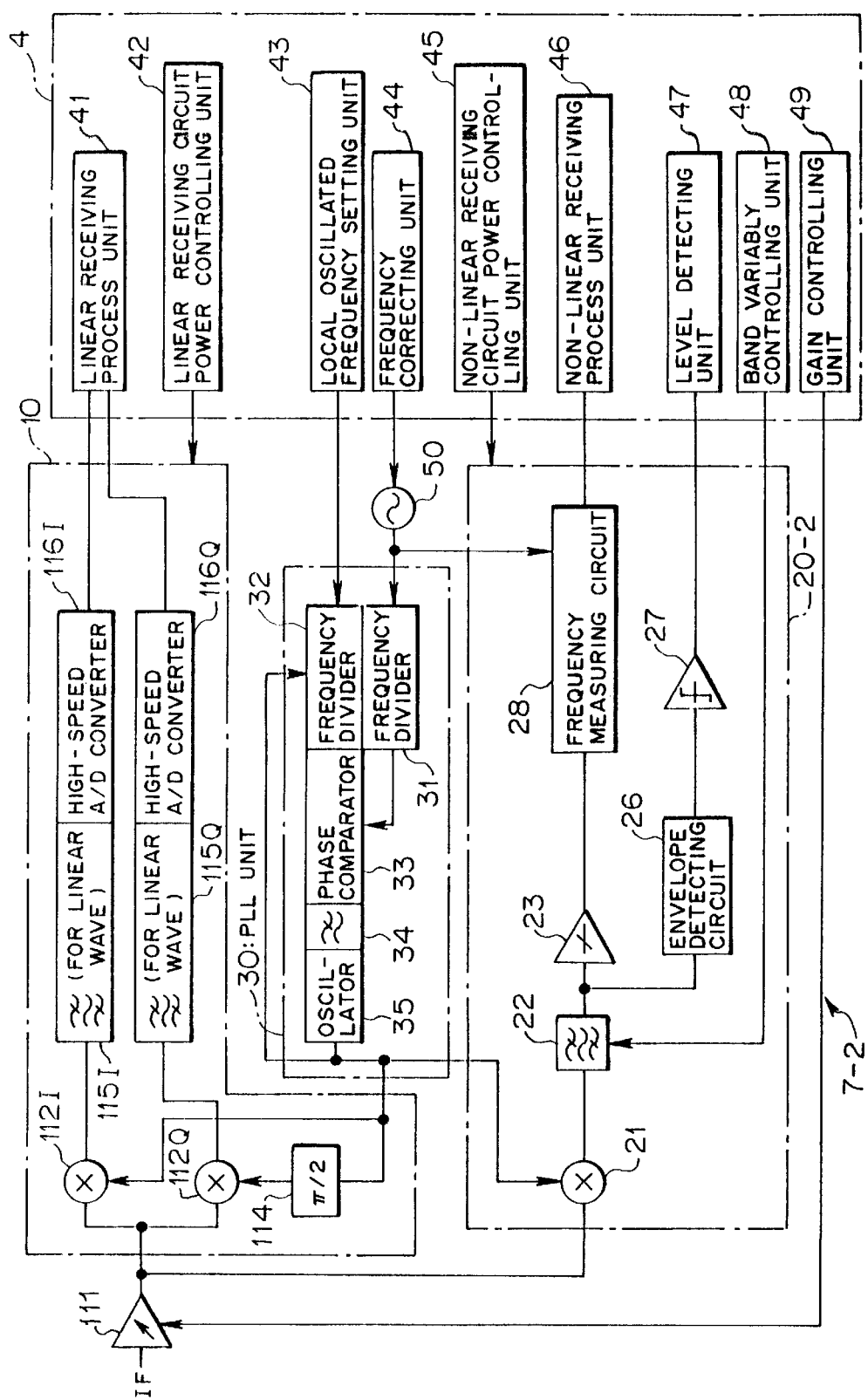
FIG. 6 is a block diagram showing a two-mode demodulating apparatus according to a second embodiment of this invention.

FIG. 6 is a block diagram showing a two-mode demodulating apparatus according to a second embodiment of this invention. A two-mode demodulating apparatus 7-2 shown in FIG. 6 has a non-linear reception demodulating circuit 20-2 with a structure different from that of the non-linear reception demodulating circuit 20-1 of the above-mentioned two-mode demodulating apparatus 7-1 according to the first embodiment.

In the non-linear reception demodulating circuit 20-2 according to the second embodiment, there is provided a frequency measuring circuit 28 instead of the delay detecting circuit 24 and the non-linear receiving low-pass filter-A/D converter 25 as the non-linear reception demodulating process unit, the frequency measuring circuit 28 demodulating a received signal.

Figure 7:
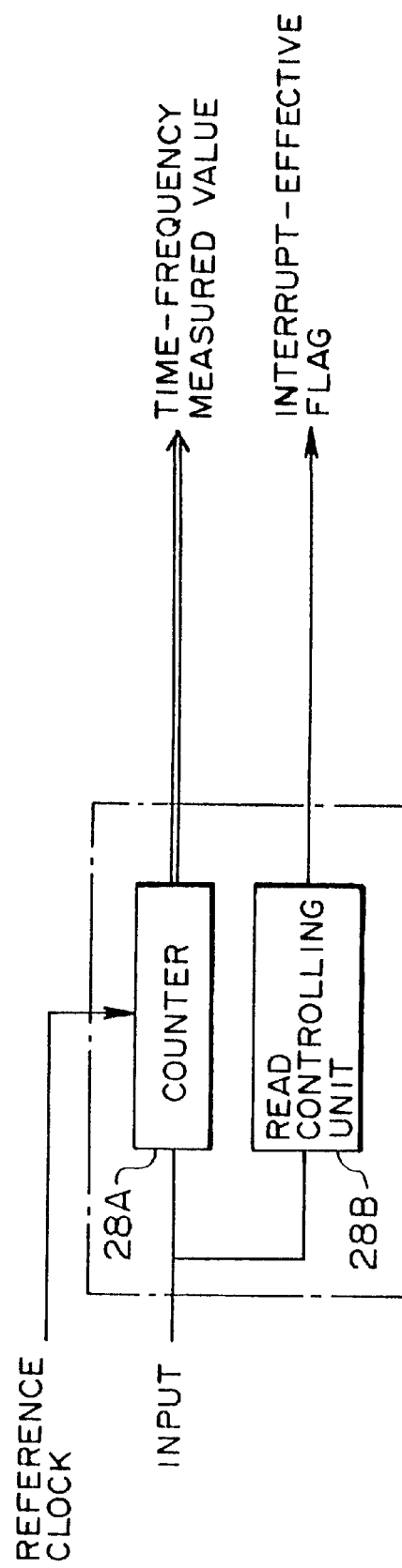
FIG. 7 is a functional block diagram showing a frequency measuring circuit according to the second embodiment.

Namely, the frequency measuring circuit 28 measures a frequency of a signal, which has been subjected to band limit such as to be adapted to a baseband signal band in a desired non-linear receiving system in the band limiting filter 22, and limited and amplified in the limiter amplifier 23, so as to output a digital demodulated signal. The frequency measuring circuit 28 has, in detail, a counter 28A and a read controlling unit 28B, as shown in FIG. 7.

The counter 28A is inputted a received signal wave form having been limited and amplified in the limiter amplifier 23, while being inputted a high frequency signal as a clock signal from the temperature-compensated oscillator 23, thereby counting with the clock signal from the temperature-compensated oscillator 50 in a state where the received signal wave form rises, for example.

In other words, a count value counted by the counter 28A shows a pulse width (or a pulse time) of the received signal. By using the pulse width information and a known clock signal frequency from the temperature-compensated oscillator 50, it is possible to measure a frequency of the received signal.

The read controlling unit 28B notifies the non-linear reception processing unit 46 in the digital processing unit 4 that the count value counted by the counter 28A is read out at a frequency interval of the input signal using an interrupt-effective flag to control the reading.

Figure 8:
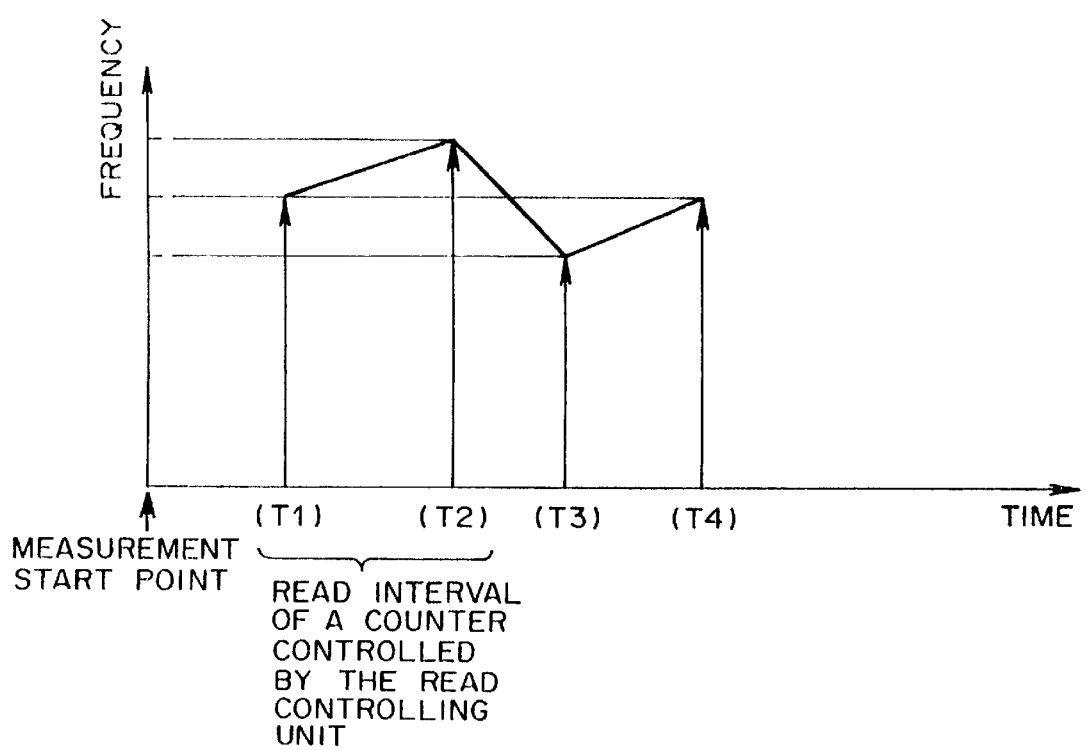
FIG. 8 is a diagram for illustrating a manner of measuring a center frequency from measured values of the frequency measuring circuit according to the second embodiment.

In concrete, the frequency measuring circuit 28 can successively read out count values showing pulse widths of the received signal from the counter 28A in order of times (T1), (T2), (T3) and (T4) shown in FIG. 8 under a read control by the read controlling unit 28B.

Namely, the frequency measuring circuit 28 can read out a count value showing a pulse width of the received signal from the counter 28A under the read control by the read controlling unit 28B in synchronization with the input signal, whereby count value data read out is used as it is as demodulated data of the received signal.

For instance, when a clock signal frequency from the temperature-compensated oscillator 50 is 10 MHz and a count value showing a pulse width of the received signal of the counter 28A is "333", a pulse time interval is given by an equation (1), a frequency of which is a reciprocal of the equation (1), as given by an equation (2):

$$\text{time interval} = 1/10^6 \times 333 \text{ [second]} \quad (1)$$

$$\text{frequency} = 10^6 \times 1/333 \text{ [Hz]} \quad (2)$$

Incidentally, the frequency measuring circuit 28 performs the frequency measuring operation with an input signal frequency as a reference. For this, measured data is not outputted at equal time intervals. However, the non-linear reception processing unit 46 computes a time integral of a change in frequency information at each of the above read times [refer to times (T1) through (T4) shown in FIG. 8], thereby measuring a center frequency of the received signal.

With the above structure, the two-mode demodulating apparatus according to the second embodiment of this invention can receive a linear received signal or a non-linear received signal and demodulate it on the basis of a receive mode setting by the linear receiving circuit power controlling unit 42, the local oscillated frequency setting unit 43 and the non-linear receiving circuit power controlling unit 45 in the digital processing unit 4, as well as the first embodiment mentioned above.

When the two-mode modulating apparatus receives and demodulates a non-linear modulated wave, particularly, the multiplier 21 converts the received signal amplified by the variable gain amplifier 111 into a signal having a low-frequency offset (signal containing basebands of various systems) on the basis of the local signal from the PLL unit 30, the band-limit filter 22 then performs band-limit on the signal, thereby allowing only a signal in a pass-band adapted to an applied non-linear modulating system as a modulating-demodulating system to pass therethrough.

The band-limited received signal from the band-limit filter 22 is amplified by the limiter amplifier 23. The frequency measuring circuit 28 directly converts the received signal from the limiter amplifier 23 on the basis of the received signal and the clock signal form the temperature-compensated oscillator 50 into frequency measured data (a count value showing a pulse time width) having a characteristic of demodulated data of a digital signal, and outputs it to the non-linear reception processing unit 46.

At this time, the digital processing unit 4 can measure a frequency deviation on the basis of the inputted frequency measured data. The frequency correcting unit 44 can correct and control a frequency of the local signal (local signal to be given to the multiplier 21) generated by the PLL unit 30 on the basis of the measured frequency deviation information to correct a frequency of the received signal.

In this case, the envelope detecting circuit 26 performs the envelope detection on the received signal whose band has been limited by the band-limit filter 22, the comparator 27 then compares it with the reference level, so as to configure a feed-back loop similar to that employed upon linear reception, whereby an electric field strength is obtained, as well.

By providing the frequency measuring circuit 28 to the two-mode demodulating apparatus according to the second embodiment of this invention, it is possible to offer the same advantages as the above first embodiment. It is also possible to directly demodulate and convert the received signal as an input signal into a digital signal so that an A/D converting process by an A/D converter becomes unnecessary when the two-mode demodulating apparatus receives a non-linear modulated wave. Accordingly, not only the circuit scale can be decreased but also the power consumption can be remarkably decreased.

(c) Description of a Third Embodiment

Figure 9:
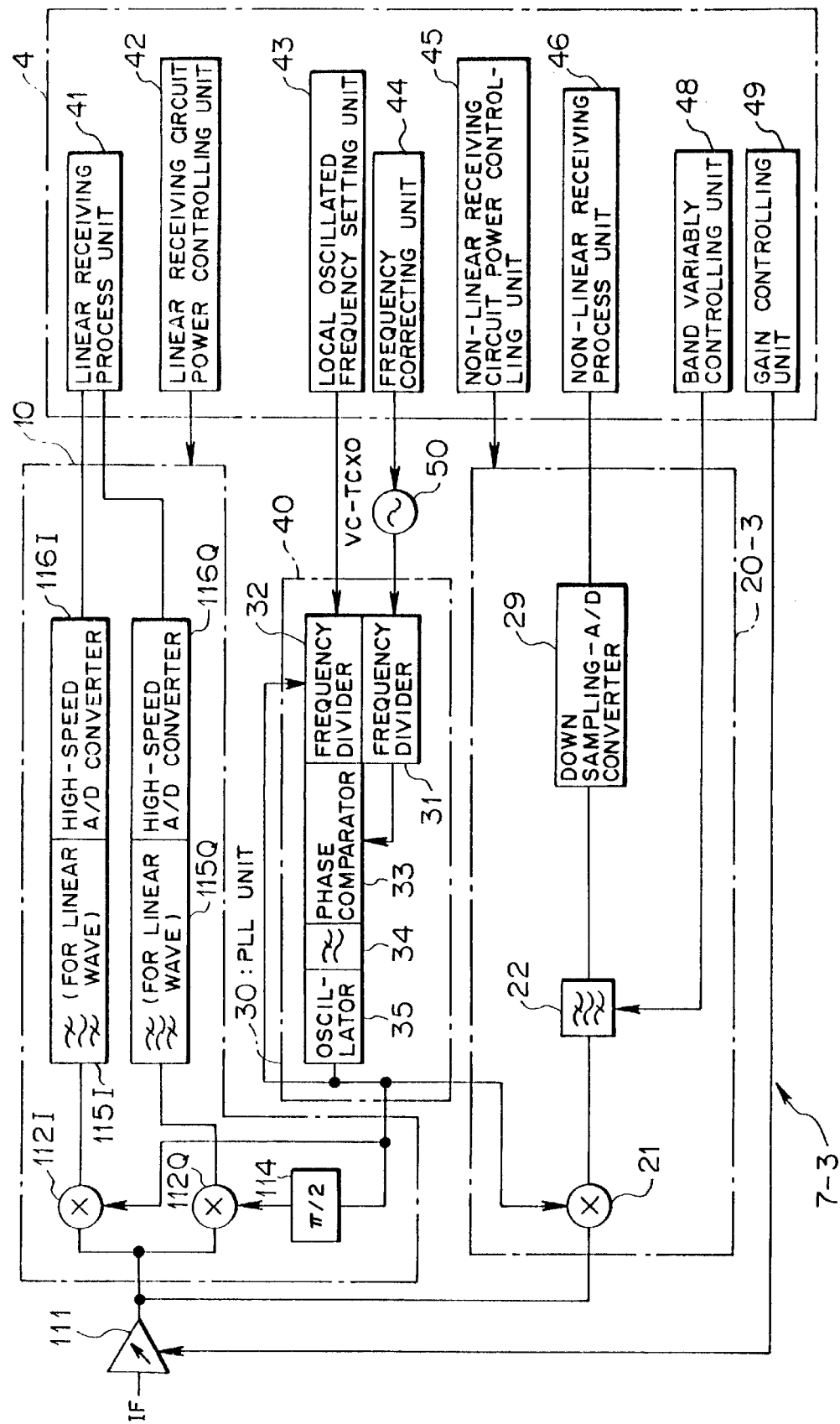
FIG. 9 is a block diagram showing a two-mode demodulating apparatus according to a third embodiment of this invention.

FIG. 9 is a block diagram showing a two-mode demodulating apparatus according to a third embodiment of this invention. A two-mode demodulating apparatus 7-3 shown in FIG. 9 has a non-linear reception demodulating circuit 20-3 having a different structure, as compared with the above two-mode demodulating apparatus 7-1 according to the first embodiment.

Namely, the non-linear reception demodulating circuit 20-3 according to the third embodiment has a down sampling-A/D converter (analog-to-digital converting circuit) 29 receiving an output from the band-limit filter 22 to perform a down sampling operation, instead of the delay detecting circuit 24, the non-linear receiving low-pass filer-A/D converter 25 as the non-linear reception demodulating process unit. The down-sampling-A/D converter 29 can demodulate the received signal.

Figure 10:
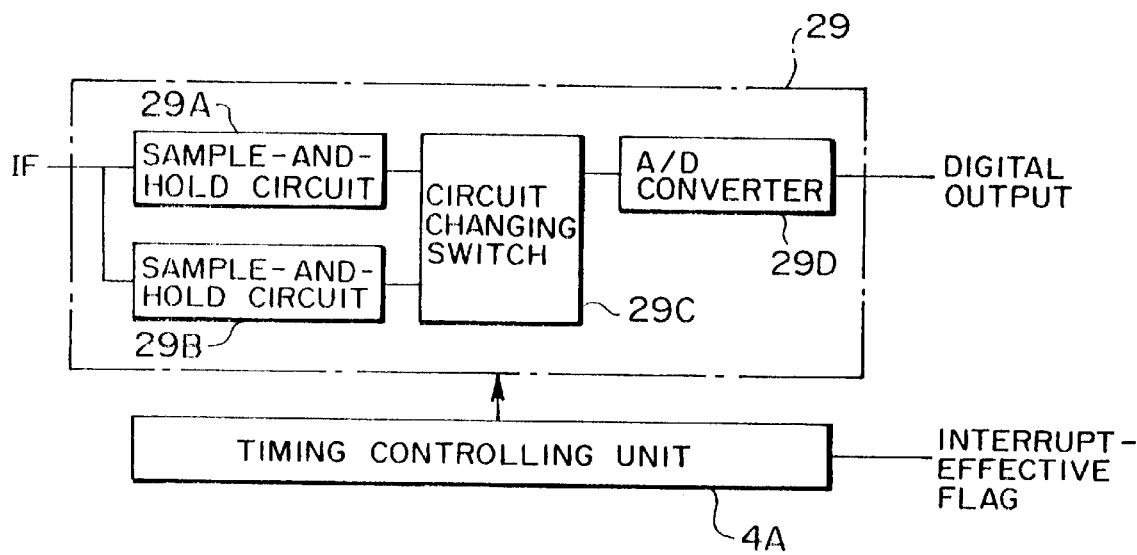
FIG. 10 is a functional block diagram showing a down sampling-A/D converter according to the third embodiment.

The down sampling-A/D converter 29 has, in detail, sample-and-hold circuits 29A and 29B in two systems, a circuit changing switch 29C and an A/D converter 29D, as shown in FIG. 10.

Figure 11:
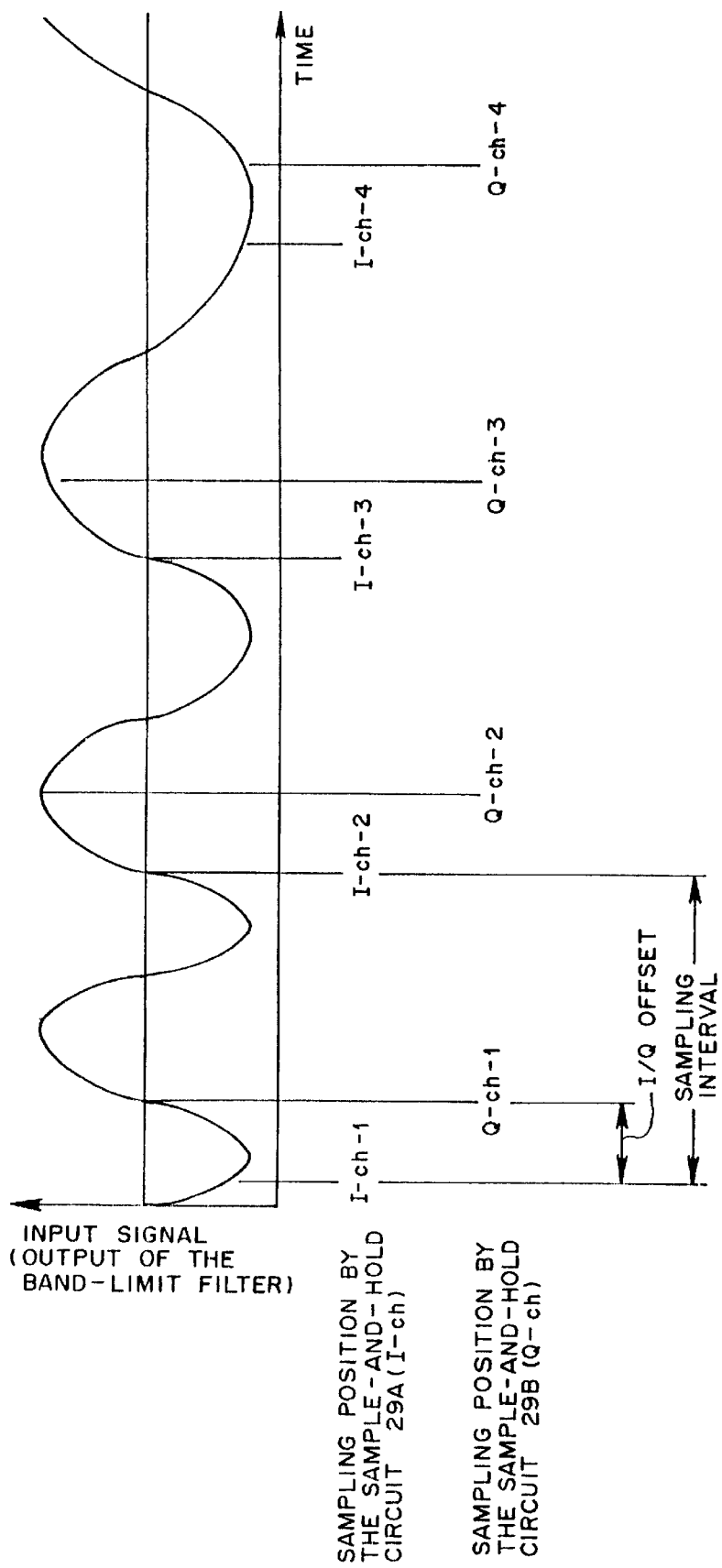
FIG. 11 is a diagram for illustrating a down sampling operation of the down sampling-A/D converter according to the third embodiment.

The sample-and-hold circuits 29A and 29B shown in FIG. 10 sample and hold (down sampling) a value of an input signal using a sampling rate lower than a frequency of the input signal as shown in FIG. 11, for example. Sample timing of each of the sample-and hold circuits 29A and 29B is controlled by a 4A in the digital processing unit 4.

In concrete, the sample timing of the sample-and-hold circuit 29A is set to a point at 0° of an IF frequency, whereas the sample timing of the sample-and-hold circuit 29B is set to a point at 90° of the IF frequency, on the basis of a control by the timing controlling unit 4A, besides a sampling cycle to sample received signal data by each of the sample-and-hold circuits 29A and 29B is set to a constant value.

The circuit changing switch 29C switches between the sample-and-hold circuits 29A and 29B to alternately output a sampled value held in the sample-and-hold circuit 29A or 29B in synchronization with a switch timing from the timing controlling unit 4A.

The A/D converter 29D converts the sampled value from the sample-and-hold circuit 29A or 29B selected by the circuit changing switch 29C into a digital signal, and outputs it. It is thereby possible to directly demodulate and convert the received signal into the digital signal without performing a filtering process and the like.

With the above structure, the two-mode demodulating apparatus according to the third embodiment of this invention can receive and demodulate a linear received signal or a non-linear received signal on the basis of a receive mode setting by the linear receiving circuit power controlling unit 42, the local oscillated frequency setting unit 43 and the non-linear receiving circuit power controlling unit 45 in the digital processing unit 4, as well as the above first embodiment.

When the two-mode demodulating apparatus receives and demodulates a non-linear modulated wave, particularly, the multiplier 21 converts the received signal having been amplified by the variable gain amplifying unit 111 into a signal having a low-frequency offset (signal containing basebands in various systems) on the basis of the local signal from the PLL unit 30, the band-limit filter 22 then band-limits the signal to allow only a signal in a pass-band adapted to an applied non-linear modulating system as a modulating-demodulating system to pass therethrough.

The received signal whose band has been limited from the band-limit filter 22 is down-sampled and A/D-converted by the down sampling-A/D converter 29 to be directly demodulated and converted into a digital signal without performing a filtering process and the like on the received signal.

The sample-and-hold circuits 29A and 29B in two systems in the down sampling-A/D converter 29 can extract two samples at times shifted 90° apart from each other of the IF frequency so that the digital processing unit 4 in the following stage can sepcify a direction of phase rotation.

The two-mode demodulating apparatus according to the third embodiment of this invention can offer the same advantages as the above first embodiment. In addition, since the two-mode demodulating apparatus according to the third embodiment has the down sampling-A/D converter 29, it is possible to operate the A/D converter 29D at a sampling rate lower than a frequency of an input signal and in a sampling cycle at equal intervals, thereby directly demodulating and converting the received signal as the input signal into a digital signal. Therefore, a complicated digital processing is unnecessary, thus the control by the digital processing unit 4 can be simplified. Moreover, it is possible to decrease a scale of a peripheral circuit as compared with the above embodiments, whereby the package is decreased in size and the power consumption is also largely decreased.

(d) Others

Irrespective of the above embodiments, the present invention may be variously modified and carried out within a scope of the present invention.

What is claimed is:

1. A two-mode demodulating apparatus comprising:
    a linear reception demodulating circuit;
    a non-linear reception demodulating circuit;
    a local oscillator; and
    a control section for controlling to selectively operate in said linear reception demodulating circuit and said non-linear reception demodulating circuit by selecting a mode, wherein
    said control section controls to place said linear reception demodulating circuit in an operative state when a receiving signal is a linear signal, and place said non-linear reception demodulating circuit in an operative state when said receiving signal is a non-linear signal,
    said local oscillator including:
        a variable oscillated frequency local oscillator for generating a first local signal having a first oscillated frequency when said receiving signal is said linear signal, and generating a second local signal having a second oscillated frequency different from said first oscillated frequency of said said first local signal, said linear reception demodulating circuit including:
        a first frequency converting unit for frequency-converting said received signal into a low-frequency signal using said first local signal from said variable oscillated frequency local oscillator; and
        a linear reception demodulating process unit for performing linear reception demodulating process on an output of said first frequency converting unit,
    said non-linear reception demodulating circuit including:
        a second frequency converting unit for frequency-converting said received signal into a low-frequency signal using said second local signal from said local oscillator;
        a variable-band filtering unit for allowing a signal in a desired band contained in an output of said second frequency converting unit to pass therethrough; and
        a non-linear reception demodulating process unit for performing a non-linear reception demodulating process on an output of said filtering unit.

2. The two-mode demodulating apparatus according to claim 1, wherein when said non-linear reception demodulating circuit is selected, said second frequency converting unit frequency-converts an intermediate frequency signal as said received signal into a signal in the vicinity of a baseband by changing an oscillated frequency of said local oscillator.

3. The two-mode demodulating apparatus according to claim 1, wherein said filtering unit is configured as an active variable-band filtering unit.

4. The two-mode demodulating apparatus according to claim 3, wherein a switched capacitor filter is used as said variable-band filtering unit.

5. The two-mode demodulating apparatus according to claim 1, wherein said non-linear reception demodulating process unit has a delay detecting circuit for performing a delay detecting process on an output from said filtering unit, and a low-pass filter/analog-to-digital converting process unit for performing a low-pass filtering process and an analog-to-digital converting process on an output from said delay detecting circuit.

6. The two-mode demodulating apparatus according to claim 1, wherein said non-linear reception demodulating unit has a frequency measuring circuit for performing a frequency measuring process on an output from said filtering unit to output a digital demodulated signal.

7. The two-mode demodulating apparatus according to claim 1, wherein said non-linear reception demodulating process unit has an analog-to-digital converting circuit for receiving an output from said filtering unit to perform a down sampling operation.

8. The two-mode demodulating apparatus according to claim 7, wherein said analog-to-digital converting circuit has sample-and-hold circuits in two systems for extracting two samples at predetermined time intervals to detect a direction of phase rotation.

9. The two-mode demodulating apparatus according to claim 1 further comprising a gain controlling amplifier for controlling a gain of said received signal before said received signal is inputted to said linear reception demodulating circuit and said non-linear reception demodulating circuit;

Wherein said non-linear reception demodulating process unit has an envelope detecting circuit for performing an envelope detecting process on an output from said filtering unit and a comparing circuit for comparing an output from said envelope detecting circuit with a predetermined reference value to output a signal for controlling said gain controlling amplifier.

* * * * *